No. 854,803.
PATENTED MAY 28, 1907.
J. W. CLOUD.
HIGH SPEED BRAKE APPARATUS.
APPLICATION FILED SEPT. 20, 1905.
2 SHEETS—SHEET 1.
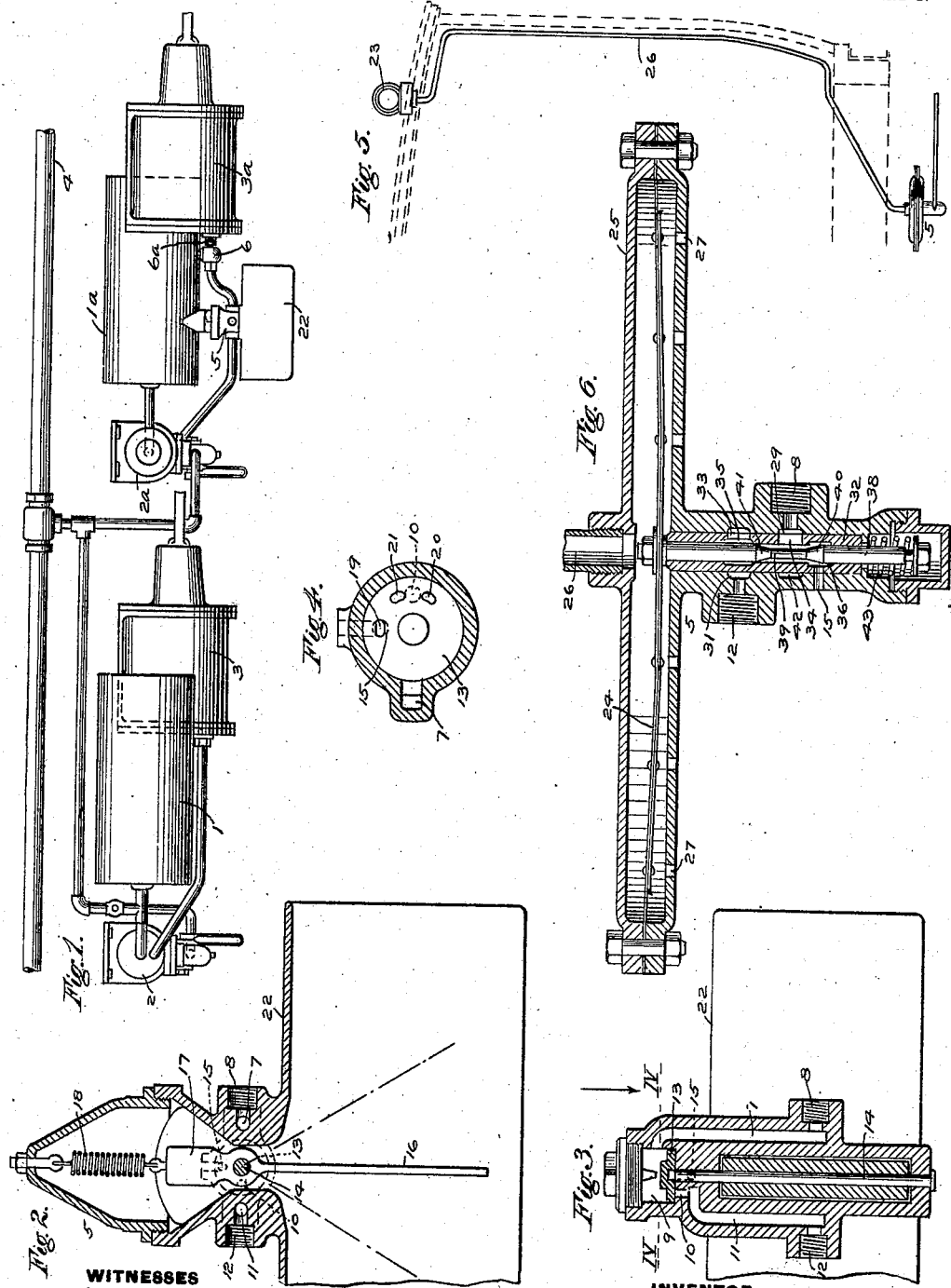
WITNESSES
INVENTOR
John W. Cloud
by E. Wright
Att'y

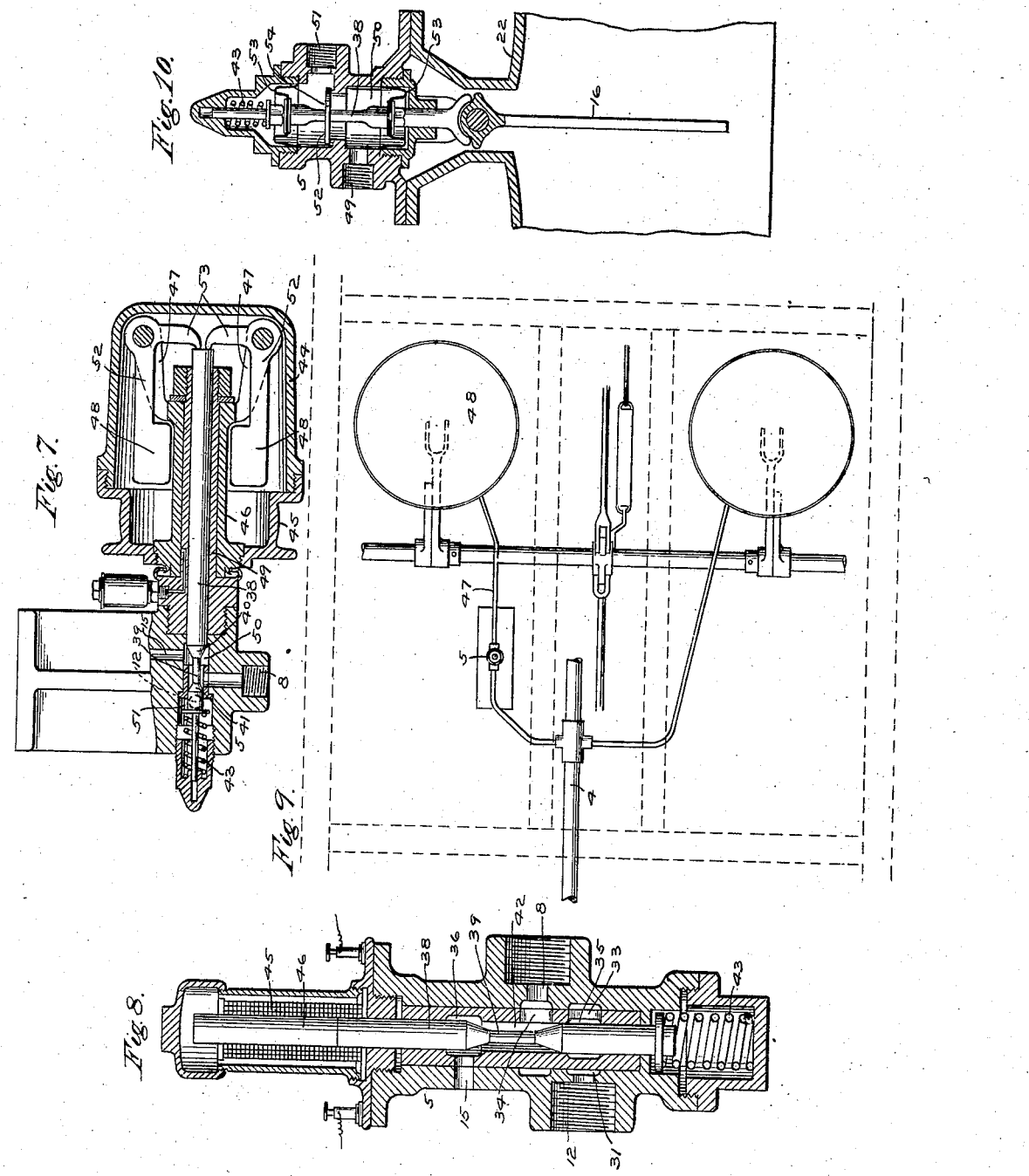

UNITED STATES PATENT OFFICE.

JOHN WILLS CLOUD, OF LONDON, ENGLAND, ASSIGNOR TO THE WESTINGHOUSE AIR BRAKE COMPANY, OF PITTSBURG, PENNSYLVANIA, A CORPORATION OF PENNSYLVANIA.

HIGH-SPEED BRAKE APPARATUS.

No. 854,803.  Specification of Letters Patent.  Patented May 28, 1907.

Application filed September 20, 1905. Serial No. 279,239.

*To all whom it may concern:*

Be it known that I, JOHN WILLS CLOUD, a citizen of the United States, and a resident of London, England, have invented a certain new and useful Improvement in High-Speed Brake Apparatus, of which the following is a specification.

This invention relates to pneumatic brakes for railway vehicles or the like.

It is well known that the coefficient of friction between the brake block and the wheel to which it is applied is less at high speeds than it is at low speeds, and also that this coefficient is less at high pressures than it is at low pressures. From the above two considerations it follows that a comparatively much higher pressure of the brake blocks on the wheels must be obtained at high speeds than is needed at low speeds in order to produce a uniform rate of retardation.

The object of this invention is to provide means whereby the maximum effective pressure of the brake blocks upon the wheels of any vehicle equipped with brake cylinders shall be dependent upon the speed of the train at the time when the brakes are set, and to provide means whereby this effective pressure shall diminish thereafter through a fixed opening so that an approximately uniform rate of retardation throughout any stop will be produced.

According to this invention, in addition to the main ordinary set of pneumatic brake apparatus, there is provided on each vehicle a second or auxiliary set of pneumatic brake apparatus which is operated through the same train pipe as the first set, and to which the admission of air on an application of the brakes is controlled by a valve which is governed in accordance with the speed of the vehicle. In order that the effective pressure thus admitted shall diminish thereafter through a fixed opening a small leak hole is provided of such a size that the pressure will be dispelled in a time about equal to the duration of the stop. The auxiliary set of pneumatic brake apparatus may, when desired, be otherwise entirely similar to the main ordinary set of pneumatic brake apparatus.

This invention is illustrated in the accompanying drawings, in which

Figure 1 is a diagrammatic view showing a main set of well known fluid pressure brake apparatus and an auxiliary set of brake apparatus, similar to the main set, to which the admission of air is controlled by a regulating valve governed in accordance with the speed of the train; Figs. 2 and 3 are respectively a longitudinal section and sectional plan of the regulating valve shown in Fig. 1; Fig. 4 is a section on the line IV—IV of Fig. 3; Fig. 5 is a diagrammatic view showing an arrangement for governing the regulating valve by means of the amount of vacuum produced by an exhauster of well known construction conveniently arranged on the vehicle and operating in accordance with the speed of the train; Fig. 6 is a section to an enlarged scale of the regulating valve shown in Fig. 5; Fig. 7 is a longitudinal section through a modified form of regulating valve governed by a centrifugal governor driven from the axle of the vehicle; Fig. 8 is a longitudinal section through a regulating valve governed, through the medium of an electro-magnet, by means of an electric current generated by apparatus mounted upon or driven by the axle of the vehicle; Fig. 9 is a diagrammatic view showing a main set and an auxiliary set of vacuum brake apparatus and a regulating valve for controlling the admission of air to the auxiliary brake cylinder; and Fig. 10 is a longitudinal section through the regulating valve shown in Fig. 9 governed in accordance with the speed of the train by means of a vane.

In Fig. 1 the invention is shown as applied in connection with two similar sets of a well known form of fluid pressure brake apparatus, the main set comprising an auxiliary reservoir 1, triple valve 2 and brake cylinder 3, and the auxiliary set comprising auxiliary reservoir $1^a$, triple valve $2^a$ and brake cylinder $3^a$, both sets being operated by means of a single train pipe 4. Interposed in the ordinary connection between the auxiliary brake cylinder $3^a$ and corresponding triple valve is a regulating valve 5 which controls passages in such a manner as to determine whether any and how much pressure from the corresponding auxiliary reservoir $1^a$ is admitted to the brake cylinder $3^a$, or preferably alternatively is allowed to escape to the atmosphere. The regulating valve 5 is operated by suitable means through the movement of the train into a position depending upon the speed, which position controls the effective pressure admitted to the brake cylinder. It is not necessary that this regulating valve shall be operated at all during the stop, as it may and in some cases it will remain in the position it was in at the time pressure was applied until such time as the effective pressure in the brake cylinder has been reduced or entirely dispelled. Between the regulating valve 5 and the auxiliary brake cylinder there is preferably inserted a check valve 6, so as to prevent the return of air from the auxiliary brake cylinder to the regulating valve 5. In order that the effective pressure thus admitted to the auxiliary brake cylinder shall diminish thereafter through a fixed opening, a small leak hole $6^a$ to the atmosphere is provided at some convenient point between the check valve 6 and the piston in the auxiliary brake cylinder of such a size that the pressure will be dispelled in a period approximately equal to the duration of the stop, and this leak hole, in the case of a fluid pressure brake, will provide communication with the atmosphere. In this manner the effective pressure admitted to the auxiliary brake cylinder will gradually decrease after admission, so that an approximately uniform rate of retardation throughout any stop will be produced. The uniform rate of retardation throughout any two stops, whether from the same initial speeds or from different initial speeds, will not necessarily be the same, and it is not desirable to attempt to produce a uniform rate of retardation for all stops because the state of the rail, namely, whether it be dry, wet, or greasy, and the resultant state of the wheel treads and brake blocks are variable conditions. With the arrangement before described the maximum retardation possible without increasing the danger of skidding the wheels is automatically adjusted to these variable conditions, because the coefficient of friction between the brake block and the wheel under the same pressures is less with a greasy rail than it is with a dry rail, and because the adhesion of the wheel itself to the rail is also less with a greasy rail than it is with a dry rail, whereby the skidding of the wheel is more liable to happen.

It will be understood that, if the amount of air which enters the brake cylinder through the regulating valve be twice as great at 80 miles per hour as it is at 40 miles per hour, it will take twice as long to escape to the atmosphere through the leak hole, and if there be a uniform rate of retardation through the stop, that it will require twice as long to stop the train in the former case as it will in the latter. With a vehicle thus equipped it will be understood that whatever takes place in the auxiliary brake cylinder will not deplete or interfere with the operation of the main brake cylinder, the sole action of the auxiliary brake cylinder being to add brake force to that obtained with the main brake cylinder when the train is running at high speed and with an intensity proportionately approximate to the speed of the train.

The regulating valve 5 may be operated by air pressure depending on the speed of the train, for example, by means of a vane, piston or diaphragm actuated by means of a blower driven from one of the axles on the vehicle, or as shown in Figs. 2, 3 and 4, by the current of air, caused by the vehicle in running through the atmosphere, acting through the medium of a vane. The regulating valve 5 comprises a suitable casing provided with a valve chamber 9, an inlet passage 7 leading from the triple valve connection 8 to the valve chamber 9, an outlet port 10 from the valve chamber 9 and connecting passage 11 communicating with the outlet 12 to the auxiliary brake cylinder, and a port 15 shown in dotted lines leading from the valve chamber 9 to the atmosphere, a disk valve 13 mounted on one end of a spindle 14 supported on bearings in the casing and a vane 16 mounted on the spindle 14 counter-balanced by a weight 17 and controlled in its movements by a spring 18. As shown in Fig. 4 the valve 13 is provided with a port 19 which normally registers with the atmospheric port 15 in the valve chamber and two inlet ports 20, 21, one of which, dependent upon the direction in which the vehicle is running, will, when the train is running above a predetermined speed, register more or less with the port 10 to the brake cylinder. With this arrangement of valve, when the brakes have been applied and when the current of air has been sufficiently strong to deflect the vane so as to wholly or partially close the outlet to the atmosphere through ports 15, 19, a state of pressure will exist in the valve chamber 9 tending to force the valve 13 against its seat and the friction thus caused will tend to hold the valve in the position in which it was in at the time the pressure was applied until such time as the pressure has leaked away or nearly so. As shown in Fig. 2, the vane 16 is preferably protected at the top and on both sides by a hood 22.

It will be understood that the regulating valve 5 is so arranged that the plane of the vane 16 is set transversely to the direction of movement of the vehicle.

According to the arrangement shown in Fig. 5, the regulating valve 5 is operated by a piston or diaphragm actuated against the influence of a spring by an excess of atmospheric pressure over a complete or partial vacuum created by the exhausting effect of the current of air, due to movement of the vehicle, as it passes through a converging and diverging passage as in a well known form of ventilator 23 or exhauster, conveniently arranged upon or under the body of the vehicle.

As shown in Fig. 6, the diaphragm 24 is supported by a suitable casing 25 and is subjected, on its upper surface, to the variable conditions of vacuum created by an exhauster 23 through a connecting pipe 26, the lower side of the diaphragm 24 being subjected to atmospheric pressure admitted through a series of holes 27. The casing of the regulating valve is provided with an inlet 8 from the triple valve communicating with a recess 29 and an outlet 12 forming a connection between a recess 31 and the pipe leading through the check valve 6 to the auxiliary brake cylinder. The recesses 29 and 31 are closed by a cylinder 32, ports 33 and 34 being provided in the cylinder 32 communicating with the recesses 31 and 29 respectively. An annular recess 35 is provided upon the inner circumference of the cylinder 32 extending a short distance above and below the port 33. The cylinder 32 is further provided on its inner circumference with an annular recess 36, which is connected with the atmosphere by a port 15 through the cylinder 32 and the casing of the valve. The ports 33 and 34 and the recess 36 are controlled by the movement of a spindle 38 which is connected to the diaphragm 24 and is reduced in diameter at a point 39 terminating in two conical shoulders 40 and 41, which control communication between the annular space 42 left between the reduced neck 39 and the inner circumference of the cylinder 32, and the recesses 36 and 35 respectively. When the pressure on both sides of the diaphragm 24 are equal, or nearly so, the valve spindle 38 is held in the lowest position by a spring 43, thus opening communication between the triple valve and the atmosphere and closing communication between the triple valve and the auxiliary brake cylinder. When, however, a complete or a partial vacuum of a predetermined degree is maintained by the exhauster 23 on the upper surface of the diaphragm 24, the diaphragm 24 is raised more or less against the influence of a spring 43 by atmospheric pressure carrying with it the valve spindle 38 so as to close, or partially close, the communication between the triple valve and the atmosphere and more or less open communication between the triple valve and the auxiliary brake cylinder. As the degree of vacuum maintained upon the upper surface of the diaphragm 24 would depend on the velocity of the current of air passing through the exhauster 23, the position of the diaphragm 24 and of the valve spindle 38 would therefore depend on the velocity of the current of air existing at any given moment, so that the size of the opening for the passage of air from the triple valve to the auxiliary brake cylinder would at any moment depend on the speed of the train.

In Fig. 7 the regulating valve 5 is shown as being controlled by a centrifugal governor which is driven from an axle of the vehicle by a belt. The governor is inclosed by a drum 44 which is provided with a driving pulley 45 and is secured to an internal cylinder 46 provided with brackets 47, in which revolving weights 48 are pivoted. The governor is supported by a cylindrical extension 49 of the valve casing upon which the inner cylinder 46 revolves. The valve casing is provided with an inlet port 8 from the triple valve, a chamber 50 communicating by a port 15 with the atmosphere, and a chamber 51 communicating by a port 12 with the auxiliary brake cylinder. Communication between the inlet 8 and the chambers 50 and 51 is controlled by a valve spindle 38 having a portion 39 of reduced diameter terminating in two conical shoulders 40, 41. The revolving weights 48 are each carried upon one arm 52 of a corresponding bell crank lever, the other arms 53 of which make contact with the end of the valve spindle 38. In the normal position of the weights, communication between the inlet 8 and the chamber 51 is closed by the shoulder 41 and communication between the inlet 8 and the atmosphere through chamber 50 is opened by the shoulder 40. The governor is so proportioned that when a predetermined speed is exceeded, the centrifugal force acting upon the weights 48 is sufficient to move the valve spindle 38 against the influence of a spring 43 so as to close, or partially close, the communication between the inlet 8 and the auxiliary brake cylinder. In this manner the amount of pressure which may be admitted to the auxiliary brake cylinder is regulated in accordance with the speed of the train.

In Fig. 8 the regulating valve 5 as shown is operated by means of an electric current, generated by apparatus (not shown) mounted upon or driven by the axle, through the medium of an electro-magnet 45. A soft iron core 46 is attached to the valve spindle 38. The construction of the valve 5 is similar to that already described with reference to Fig. 6, with the exception that as the spindle is moved in the opposite direction to that shown in Fig. 6, the arrangement of the spring 43 and the order of the outlet 12 to the brake cylinder, port 33, inlet 8 from the triple valve, port 34, and the outlet 15 to the atmosphere are reversed. It will be understood that as the current generated depends on the speed of the train, the position of the valve 5 will also be in accordance therewith.

In the case of the vacuum brake the regulating valve 5, as shown in Fig. 9, is inserted in a branch pipe 47 leading from the single train pipe 4 to an auxiliary brake cylinder 48 of known construction, so that the regulating valve 5 controls the amount of air which enters the brake cylinder on the pressure side.

In the case of a vacuum brake the leak hole instead of communicating with the atmosphere will provide a communication between the train pipe side of the piston and the reservoir side thereof and may be arranged either in the piston or through the casing.

A suitable construction of regulating valve for a vacuum brake is shown in Fig. 10. The casing is provided with an inlet 49 from the branch pipe 47 of the train pipe 4 to a valve chamber 50 and an outlet 51 to the auxiliary brake cylinder 48. Communication between the inlet 49 and the outlet 51 is controlled by a valve 52 on a spindle 38. The valve chamber 50 is sealed at each end by a diaphragm 53 attached to the valve spindle 38. A small passage 54 is provided through the valve 52, through which the auxiliary brake cylinder 48 may be exhausted in preparation for another application of the brakes. The leakage through this small passage for setting the brakes is not material and is compensated by a somewhat larger leak hole through or around the brake piston than would be otherwise needed. The valve spindle 38 may be operated as shown against the influence of a spring 43 by a vane 16, as already described with reference to Figs. 2, 3 and 4, or by means of an exhauster as described with reference to Fig. 6, or by means of an electric current, generated by apparatus mounted upon or driven by the axle, through the medium of an electro-magnet as described with reference to Fig. 8.

It will be understood that in vacuum brake apparatus no check valve is necessary.

A cock may be arranged in the branch pipe leading from the train pipe to the auxiliary set of brake apparatus so that this set may be entirely cut out of action by simply manipulating the cock.

Having now described my invention, what I claim as new and desire to secure by Letters Patent is:—

1. A fluid pressure brake apparatus comprising a main brake set, an auxiliary brake set, and a speed controlled valve device for regulating the amount of braking pressure exerted by the auxiliary brake set.

2. In a fluid pressure brake, the combination with a train pipe, auxiliary reservoir, triple valve, and brake cylinder, of an additional triple valve, auxiliary reservoir, and brake cylinder, and a speed controlled valve device for regulating the amount of fluid under pressure admitted to the additional brake cylinder.

3. In a fluid pressure brake, the combination with a train pipe, auxiliary reservoir, triple valve, and brake cylinder, of an additional brake cylinder, and a speed controlled valve device for regulating the amount of fluid under pressure admitted to the additional brake cylinder.

4. In a fluid pressure brake, the combination with a train pipe, auxiliary reservoir, triple valve, and brake cylinder, of an additional triple valve, auxiliary reservoir, and brake cylinder, and a speed controlled valve device for governing communication from the additional triple valve to the additional brake cylinder and to the atmosphere.

5. In a fluid pressure brake, the combination with a train pipe, auxiliary reservoir, triple valve, and brake cylinder, of an additional brake cylinder, a speed controlled valve device for regulating the amount of fluid under pressure admitted to the additional brake cylinder, and means for gradually diminishing the pressure in the additional brake cylinder.

6. In a fluid pressure brake, the combination with a train pipe, auxiliary reservoir, triple valve, and brake cylinder, of an additional brake cylinder, a speed controlled valve device for regulating the amount of fluid under pressure admitted to the additional brake cylinder, and a small leak port from the second brake cylinder to the atmosphere.

7. In a fluid pressure brake, the combination with a train pipe, auxiliary reservoir, triple valve, and brake cylinder, of an additional auxiliary reservoir, triple valve, and brake cylinder, a speed controlled valve device governing communication from the additional triple valve to the second brake cylinder and to the atmosphere, and a small open leak port from the second brake cylinder to the atmosphere.

8. In a fluid pressure brake, the combination with a train pipe, auxiliary reservoir, triple valve, and brake cylinder, of an additional auxiliary reservoir, triple valve, and brake cylinder, a speed controlled valve device governing communication from the additional triple valve to the second brake cylinder, and means tending to hold said governing valve in the same position throughout the period of the stop.

In testimony whereof I have hereunto set my hand.

JOHN WILLS CLOUD.

Witnesses:
H. B. GREEN,
A. T. EBSWORTH.